United States Patent
Vaughan

(10) Patent No.: US 10,030,602 B2
(45) Date of Patent: Jul. 24, 2018

(54) ADAPTIVE MACHINE LEARNING METHOD TO PREDICT AND CONTROL ENGINE COMBUSTION

(71) Applicant: The Regents of The University of Michigan, Ann Arbor, MI (US)

(72) Inventor: Adam Vaughan, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 144 days.

(21) Appl. No.: 14/806,037

(22) Filed: Jul. 22, 2015

(65) Prior Publication Data

US 2016/0025028 A1 Jan. 28, 2016

Related U.S. Application Data

(60) Provisional application No. 62/027,473, filed on Jul. 22, 2014.

(51) Int. Cl.
*F02D 41/26* (2006.01)
*F02D 41/14* (2006.01)
(Continued)

(52) U.S. Cl.
CPC ......... *F02D 41/263* (2013.01); *F02D 35/023* (2013.01); *F02D 35/028* (2013.01);
(Continued)

(58) Field of Classification Search
CPC ............. F02D 41/1402; F02D 41/1405; F02D 2041/1412; F02D 2041/142;
(Continued)

(56) References Cited

U.S. PATENT DOCUMENTS

| 6,021,767 A * | 2/2000 | Yasui | F02D 41/1402 |
| | | | 123/674 |
| 7,201,138 B2 * | 4/2007 | Yamaguchi | F02D 35/028 |
| | | | 123/305 |

(Continued)

OTHER PUBLICATIONS

A. Vaughan, et al "A Cycle-to-Cycle Method to Predict HCCI Combustion Phasing", Proceedings of the ASME 2013 Internal Combustion Engine Division Fall Technical Conference; ICEF2013-19203 (Oct. 2013).

*Primary Examiner* — Sizo Vilakazi
*Assistant Examiner* — Kevin R Steckbauer
(74) *Attorney, Agent, or Firm* — Harness, Dickey & Pierce, P.L.C.

(57) ABSTRACT

A method is provided for controlling an internal combustion engine on a cycle-by-cycle basis. The method includes: maintaining training data used to identify a mapping function for the engine; populating a buffer with adaptive data for a given cylinder, where the adaptive data are measures of the inputs and the output of the mapping function that were captured during a number of recent operating cycles of the given cylinder; combining training data for the mapping function with the adaptive data; identifying the mapping function from the combined data set using a weighted least squares method; predicting a combustion feature of the given cylinder in the next cycle using the mapping function and measures of the inputs during the present cycle; and controlling the engine based in part on the predicted combustion feature of the given cylinder in the next cycle using one or more actuators.

21 Claims, 11 Drawing Sheets

(51) Int. Cl.
*F02D 41/00* (2006.01)
*F02D 41/40* (2006.01)
*F02D 35/02* (2006.01)

(52) U.S. Cl.
CPC ....... *F02D 41/008* (2013.01); *F02D 41/1405* (2013.01); *F02D 41/401* (2013.01); *F02D 35/021* (2013.01); *F02D 2041/1412* (2013.01); *Y02T 10/44* (2013.01)

(58) Field of Classification Search
CPC ..... F02D 2041/1423; F02D 2041/1429; F02D 2041/143; F02D 35/028
See application file for complete search history.

(56) References Cited

U.S. PATENT DOCUMENTS

| | | | |
|---|---|---|---|
| 7,296,556 B2* | 11/2007 | Yamaguchi | F02D 35/023 123/305 |
| 7,360,525 B2* | 4/2008 | Yamaguchi | F02D 41/0025 123/406.11 |
| 7,761,219 B2* | 7/2010 | Loeffler | F02D 35/028 701/103 |
| 9,217,387 B2* | 12/2015 | Loeffler | F02D 35/023 |
| 9,376,979 B2* | 6/2016 | Jade | F02D 41/2451 |
| 2006/0069493 A1* | 3/2006 | Attard | F02D 35/021 701/106 |
| 2007/0012289 A1* | 1/2007 | Yamaguchi | F02D 35/028 123/406.47 |
| 2007/0012290 A1* | 1/2007 | Yamaguchi | F02D 35/023 123/406.47 |
| 2007/0055437 A1* | 3/2007 | Yamaguchi | F02D 41/0025 701/104 |
| 2008/0053404 A1* | 3/2008 | Mizuno | F02D 35/023 123/406.19 |
| 2009/0182483 A1* | 7/2009 | Loeffler | F02D 35/028 701/103 |
| 2009/0182485 A1* | 7/2009 | Loeffler | F02D 35/023 701/103 |
| 2013/0073185 A1 | 3/2013 | Hellstrom et al. | |
| 2013/0090837 A1* | 4/2013 | Jade | F02D 41/2451 701/104 |
| 2014/0278007 A1 | 9/2014 | Wilcutts et al. | |
| 2017/0009672 A1* | 1/2017 | Sasaki | F02D 41/26 |

* cited by examiner

ADAPTIVE MACHINE LEARNING METHOD TO PREDICT AND CONTROL ENGINE COMBUSTION

CROSS-REFERENCE TO RELATED APPLICATIONS

This application claims the benefit of U.S. Provisional Application No. 62/027,473, filed on Jul. 22, 2014. The entire disclosure of the above application is incorporated herein by reference.

FIELD

The present disclosure relates to an adaptive machine learning method to predict and control engine combustion.

BACKGROUND

Since the 1800s, gasoline engines have largely been operated by (1) controlling power output with a throttle that restricts airflow, (2) using a simple spark to control burn timing, and (3) operating close to fuel-air stoichiometry for reliable spark ignition and so catalysts can reduce $NO_x$, HC, and CO emissions. The throttle hurts fuel efficiency with pumping losses (especially at low-load), and the stoichiometric mixtures used are thermodynamically less fuel efficient than mixtures diluted with air or exhaust gases.

With the broad availability of enabling technologies (e.g. variable valve timing), a relatively new type of combustion called homogeneous charge compression ignition (HCCI) has received increased research interest over the past decade. HCCI uses autoignition to burn lean (excess air) mixtures and can produce ultra-low $NO_x$ quantities that do not require expensive catalyst aftertreatment. Instead of a spark, combustion timing is controlled by the thermodynamic trajectory of the mixture and complex chemical kinetics. With both ultra-low $NO_x$ production and freedom from the stoichiometric shackles of spark ignition, HCCI, achieves greater fuel efficiency through thermodynamically ideal lean mixtures and unthrottled operation. This improved fuel economy, has real-world relevance to near-term sustainability, national oil independence, and greenhouse gas initiatives that seek to curb petroleum usage.

The primary challenge of HCCI autoignition is to ensure that the burn timing is synchronized against the motion of the piston varying the cylinder volume as function of crank angle. These angles are measured relative to when the piston is at the top of the cylinder, or Top Dead Center (TDC). In a four-stroke engine, TDC occurs twice per cycle. In different regions, the piston may be compressing or expanding the mixture, or, if a valve is open, moving the mixture into or out of the intake or exhaust manifolds.

Highlighted on the cylinder volume curve are two regions, one for when the exhaust valve is open and the other for when the intake valve is open. Note that the two valve events are separated by a number of crank angle degrees, termed Negative Valve Overlap or NVO. Unlike conventional engines, NVO prevents some of the hot exhaust gases from leaving the cylinder (typically 20-60%). This stores "residual gases" for the next cycle, offering a practical way to raise the mixture temperature to ensure HCCI autoignition. By changing the amount of NVO, one can affect the mixture temperature and dilution and ultimately control the chemical kinetics behind combustion timing. Temperature and dilution work in opposite directions, but typically temperature dominates. NVO is not instantly adjustable with common variable valve timing systems, and the reader is cautioned that many researchers publish results with fully variable (lift and timing) electric or hydraulic valve actuation systems that are expensive to implement in production engines.

The use of NVO residual gases introduces strong cycle-to-cycle coupling on top of the already non-linear chemistry and physics that occur throughout a complete engine cycle. Further compounding the issues with residual gases is that neither the airflow to the cylinder(s) nor the quantity of residual gases in the cylinder(s) can be accurately resolved before a burn happens on a cycle-to-cycle (not mean value) basis with commonly available sensors, especially during transients. Beyond residual gas influences, there are also complex secondary influences on combustion behavior such as turbulent mixing, manifold resonance effects, combustion deposits, different varieties of fuel and even ambient temperature variations.

While HCCI is already a significant challenge given the above complexity, the combustion mode also exhibits a period doubling bifurcation cascade to chaos, similar to what is seen in high residual spark ignition engines. When nearly chaotic, HCCI is still deterministic, but becomes oscillatory and very sensitive to parameter variations (e.g. residual gas fraction fluctuations). This oscillatory "stability limit" behavior is commonly referred to as high Cyclic Variability (CV) and it severely constrains the available load limits of HCCI.

This section provides background information related to the present disclosure which is not necessarily prior art.

SUMMARY

This section provides a general summary of the disclosure, and is not a comprehensive disclosure of its full scope or all of its features.

A method is provided for controlling an internal combustion engine on a cycle-by-cycle basis. The method uses a mapping function which defines a relationship between inputs and an output associated with the internal combustion engine, where the output is a given combustion feature of a given cylinder in the engine at a next cycle and the inputs include the given combustion feature of the given cylinder in a present cycle and parameters indicative of mixture state and composition or engine actuator settings from one cycle to the next cycle. The method includes: maintaining training data used to identify the mapping function in a data store associated with a controller; populating a buffer with adaptive data for the given cylinder, where the adaptive data are measures of the inputs and the output of the mapping function that were captured during a number of recent operating cycles of the given cylinder; combining the training data with the adaptive data to form a combined data set; identifying the mapping function from the combined data set using a weighted least squares method; predicting the given combustion feature of the given cylinder in the next cycle using the mapping function and measures of the inputs during the present cycle; and controlling the engine based in part on the predicted combustion feature of the given cylinder in the next cycle using one or more actuators.

In one aspect, the method pertains to an internal combustion engine operating under homogenous charge compression ignition. In this aspect, the mapping function defines combustion timing of a given cylinder in the engine at a next cycle in terms of inputs selected from a group consisting of combustion timing of the given cylinder in present cycle, an indicator of fuel injected into the given cylinder in the present cycle, crank angle at which fuel injection occurred in the present cycle and one or more pressure measures made inside the given cylinder. In another aspect, a controller is provided for an internal combustion engine residing in a vehicle. A data store associated with the controller stores training data used to identify a mapping function, where the mapping function defines a relationship between inputs and an output associated with the engine, the output is combustion timing of a given cylinder of the engine in a next cycle, and the inputs include combustion timing of the given cylinder in the given cylinder in a present cycle and one or more parameters indicative of mixture state and composition from the present cycle to the next cycle. A buffer accessible to the controller stores adaptive data for the given cylinder, where the adaptive data are measures of the inputs and corresponding output of the mapping function captured during a number of burn cycles of the given cylinder. The controller in turn implements an adaptor module, a predictor module, and a control module. The adaptor module is configured to receive adaptive data for the given cylinder and operates to populate the buffer with the received adaptive data. The predictor module operates to combine the training data with the adaptive data residing in the buffer, determine a vector that scales the inputs of the mapping function to the output of the mapping function using a weighted least squares method, and predict combustion timing for the given cylinder in the next cycle using measures of the inputs during the present cycle and the vector. The control module is interfaced with one or more fuel injectors and operates to control the fuel injectors based in part on the predicted combustion timing for the given cylinder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
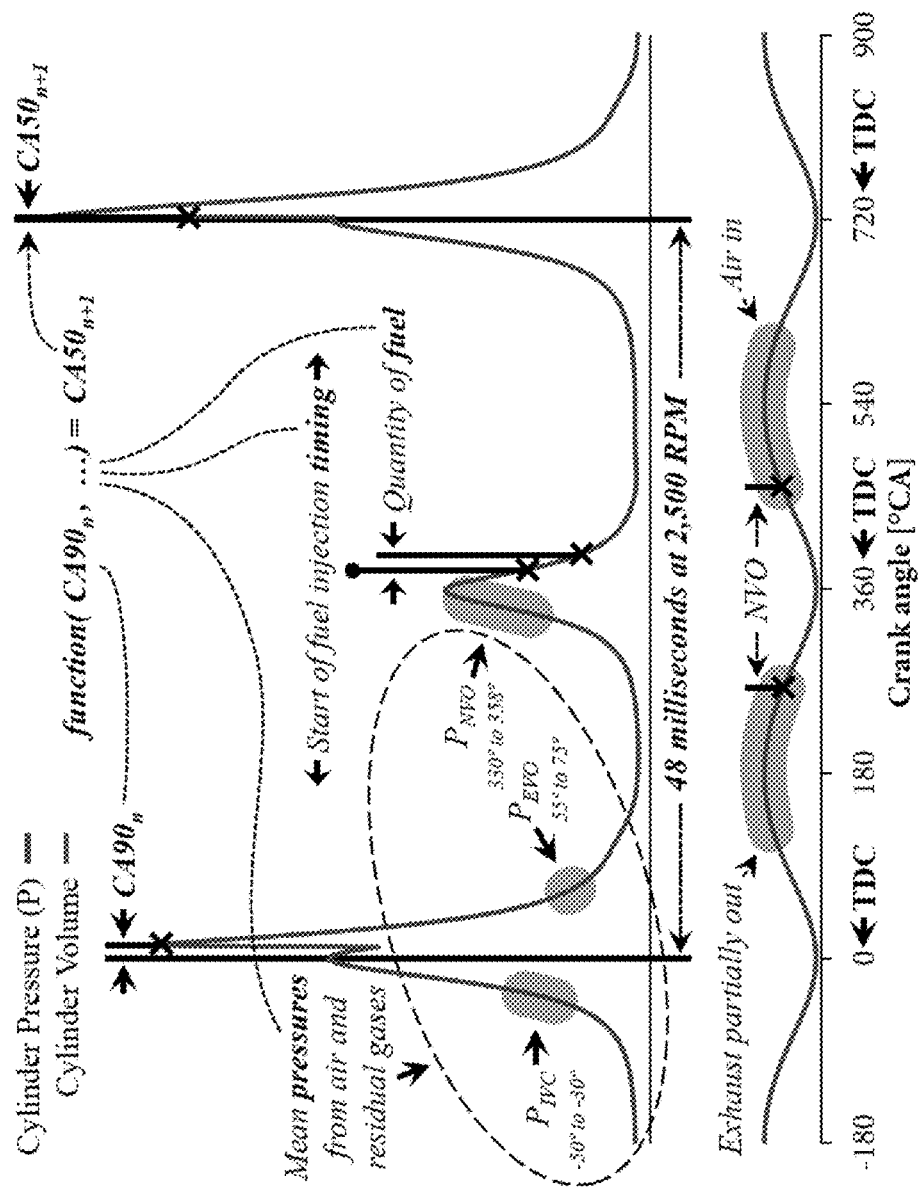
FIG. 1 is a schematic of key engine cycle variables.

FIGS. 9A-9D are graphs depicting predicted versus measured WR-ELM model of Eq. 2 across 25,323 consecutive cycles with random transient steps occurring approximately every 0.5-10 seconds and occasional misfires; and FIGS. 10A-10L are graphs showing how the WR-ELM model of Eq. 2 can track CA50 through transients every 0.5-10 seconds, operating points with near chaotic high CV, and at steady-state during a particularly harsh region of the 25,323 cycle dataset that includes misfires.

Corresponding reference numerals indicate corresponding parts throughout the several views of the drawings

DETAILED DESCRIPTION

Example embodiments will now be described more fully with reference to the accompanying drawings.

A primary constraint for HCCI is the need to keep combustion timing between the ringing and combustion stability limits. At the ringing limit, excessive pressure rise rates are encountered, and at the stability limit, high CV in combustion timing is observed. Since these limits play a key role in constraining HCCI's usable operating range, it is desirable to explore new methods to predict the behavior at and beyond these constraints. In particular, the ability to predict and correct for high CV might enable the use of late phased combustion to mitigate the excessive pressure rise rates that currently constrain HCCI's high load operation, while also potentially addressing the high CV experienced at low-load. Towards the end goal of expanding the HCCI load envelope, this disclosure builds on previous works by describing a new online adaptive machine learning method that enables fully causal cycle-to-cycle combustion timing predictions across randomly chosen engine set point transients that include both the stable and near chaotic bifurcation behavior. While reference is made to internal combustion engines operating under HCCI, the broader aspects of this disclosure are applicable other types of combustion schemes as well.

With these goals in mind, an abstract mapping function for engine combustion is presented within the framework of a discrete dynamical system:

next combustion =function (previous combustion, parameters)

Figure 2:
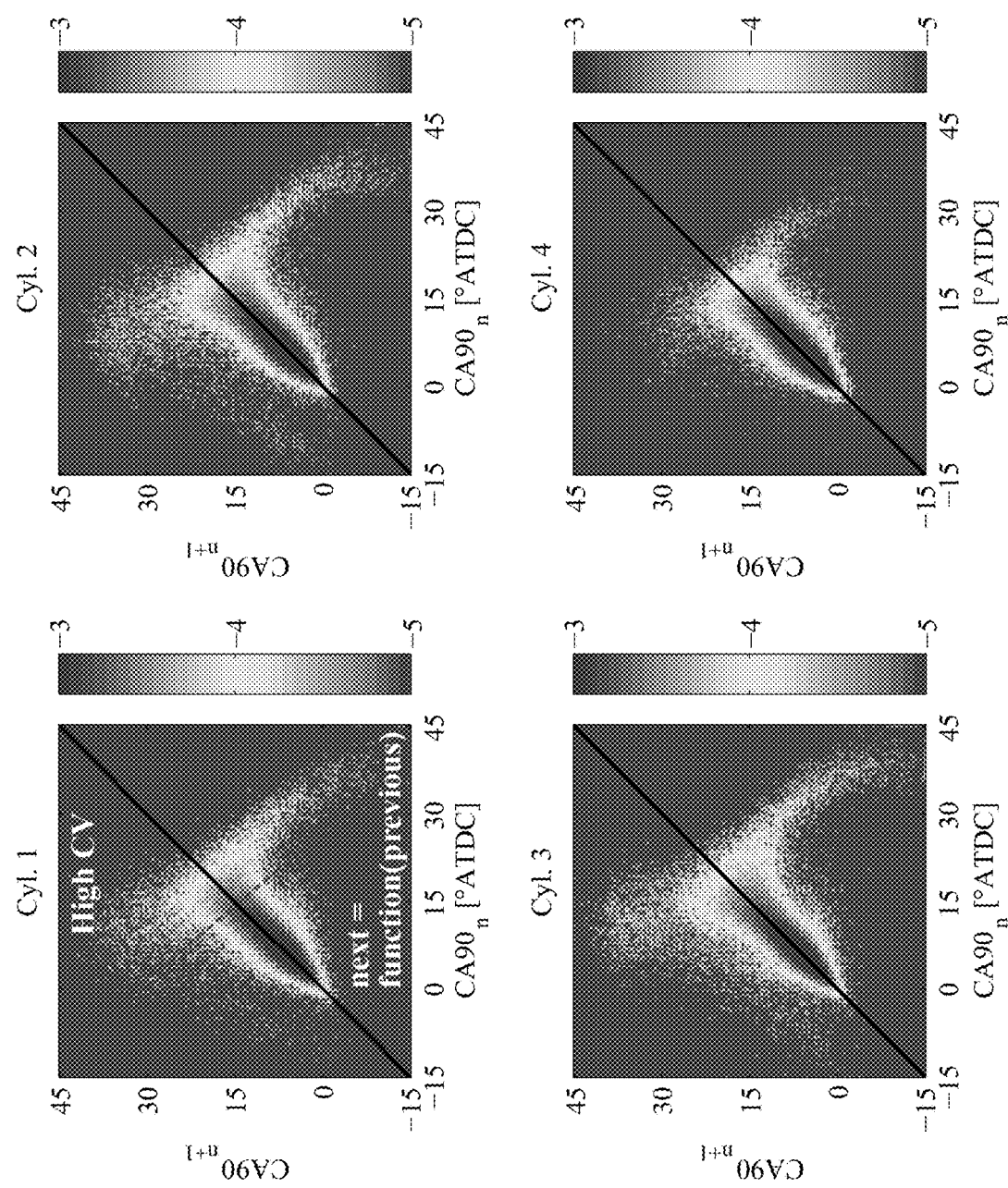
FIG. 2 are histograms illustrating a return map probability of CA90 generated from 129,964 cycles and 2,221 random engine set points.

This simple abstraction is intended to convey a conceptual understanding of the experimental cycle-to-cycle behavior seen in the return maps of FIG. 2. These return maps show the experimentally observed combustion timing for a given cycle n along the abscissa and the next cycle n+1 along the ordinate under random engine actuator set points. The value of CA90 is the time in Crank Angle Degrees (° CA) where 90% of the fuel's net heat release is achieved, and thus measures the timing of the end of the burn in relation to piston's position as the crank rotates. While it is not shown here, there is similar structure in the CA10 and CA50 percent burn metrics, although less pronounced (especially in CA10).

It should be noted that there is structure to the cycle-to-cycle behavior despite the random actuator set points used to generate FIG. 2. This structure shows a deterministic transition to oscillatory high CV behavior as combustion moves towards later combustion timing that can be viewed as at least a single period doubling bifurcation with sensitive dependence on the engine set point. While mathematically interesting, this oscillatory high CV structure undesirably constrains practical HCCI engine operation. A more thorough description of this mapping function and this data is provided in "A Cycle-to-cycle Method to Predict Internal Combustion Engine Division", 2013 Fall Technical Conference ICEF2013-19203, 2013 which is incorporated in its entirety herein.

Figure 3:
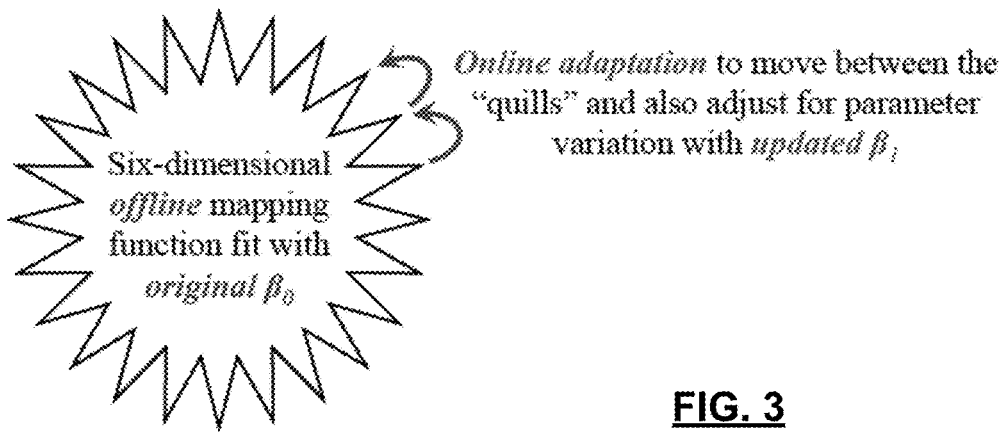
FIG. 3 is a diagram showing how high dimensional data might be viewed conceptually as a "porcupine"

In this disclosure, machine learning provides a computationally efficient way to capture complex cycle-to-cycle combustion patterns while simultaneously avoiding explicit knowledge of the underlying mixture state and composition (provided an appropriate abstract mapping function is chosen). While there are clearly benefits to a machine learning approach, a key issue is that machine learning is data driven, and relatively large quantities of data are needed to adequately cover large dimensional spaces. As shown conceptually in FIG. 3, these high dimensional data might be viewed as a "porcupine". Each engine operating condition might be viewed as a "quill" of Eq. 2's six-dimensional "porcupine," and machine learning algorithms know nothing about the ideal gas law or chemical kinetics, so their ability to extrapolate between "quills" is limited, especially when provided sparse data. Previous works have used a random sampling of cycle time series for training to ensure the data driven model had data to fit the "quills," and then assessed the model's ability to predict on the remaining (randomly chosen) cycles. Thus, the training dataset was partially acausual and that the model itself wasn't shown to adapt to new conditions.

One contribution of this disclosure is the development of a new online learning method to provide real-time adaptive, fully causal predictions of near chaotic HCCI combustion timing. This method, called Weighted Ring-Extreme Learning Machine (WR-ELM), enables robust online updates to an Extreme Learning Machine (ELM) model that is trained to fit the "quills" of offline data.

In an example embodiment, engine combustion is abstracted to the following mapping function:

$$CA50_{n+1} = \text{function}(CA90_n, TI, SOI, P_{IVC}, P_{EVO}, P_{NVO}) \quad (2)$$

where n is the cycle iteration index, CA50 is the time in °CA where 50% of net heat release has occurred, CA90 is the time in °CA when 90% of net heat release has occurred, TI is the injection pulse width in milliseconds, SOI is Start of Injection in °CA Before Top Dead Center (°BTDC), and the pressure variables measurements are mean pressures during specific regions of the combustion cycle (see FIG. 1). Since CA90 is a stronger indicator of the oscillatory behavior seen in FIG. 2, it is used as the model input. CA50 is more commonly encountered in the engine literature and is thus used as the model output. The two are related quantities, and in terms of model fit statistics there was no significant benefit of using one over the other. That said, a few isolated instances were observed where CA90 did a better job predicting large oscillations. While reference is made to these two particular combustion timing parameters, it is understood that the mapping function may employ other combustion features beyond timing within the broader aspects of this disclosure.

TI is intended to capture the quantity of fuel injected and it is noted that the methods set forth herein are not limited to any particular type of fuel or mixture of fuels. While fuel rail pressure is constant; however, it should be noted that the pressure drop to cylinder pressure during NVO injections varies with each transient step and during high CV regions, which influences the injected fuel quantity. The cylinder pressure variables $P_{IVC}$, $P_{EVO}$ and $P_{NVO}$ were chosen to capture cycle-to-cycle residual coupling and air flow without the difficulties of explicitly modeling those quantities. The subscripts IVC, EVO, and NVO refer to the general timing regions Intake Valve Close, Exhaust Valve Open, and Negative Valve Overlap, respectively. That is, $P_{IVC}$ is the mean pressure inside a given cylinder when gas is being compressed, $P_{EVO}$ is the mean pressure inside the given cylinder before gas is fully expanded, and $P_{NVO}$ is the mean pressure in the given cylinder during carryover from one combustion cycle to another combustion cycle. To meet real-time engine controller timing requirements, $P_{IVC}$ and $P_{NVO}$ have been modified from the previous publication. $P_{IVC}$ has been moved to the previous cycle, and the range of $P_{NVO}$'s mean has been shortened. $P_{IVC}$ has also been moved closer to TDC to take advantage of the inherent signal amplification provided by the compression process.

In the example embodiment, the extreme learning method (ELM) is used to identify the mapping function. The primary benefits of an ELM approach are: an ELM is easily adapted to online adaption; an ELM provides good model generalization when the data are noisy; and an ELM is extremely computationally efficient. While particular reference is made to ELM, it is readily understood that other methods for identifying the mapping functions (such as unsupervised deep learning) also fall within the broader aspects of this disclosure.

More specifically, WR-ELM is developed in this disclosure as a weighted least squares extension to Online Sequential-ELM. The data in the WR-ELM ring buffer can be weighted more heavily than the data originally used to fit the offline model. This allows emphasis to be placed on recent measurements that might be between the "quills" of the offline trained model or the result of day-to-day engine parameter variation. Thus, this approach allows one to prescribe a partitioned balance between the offline model fit against the need to adapt to the most recent conditions. It also explicitly avoids over adaption to the local conditions (that could compromise global generality) by "forgetting" old ring buffer data that eventually exit the buffer.

Figure 4:
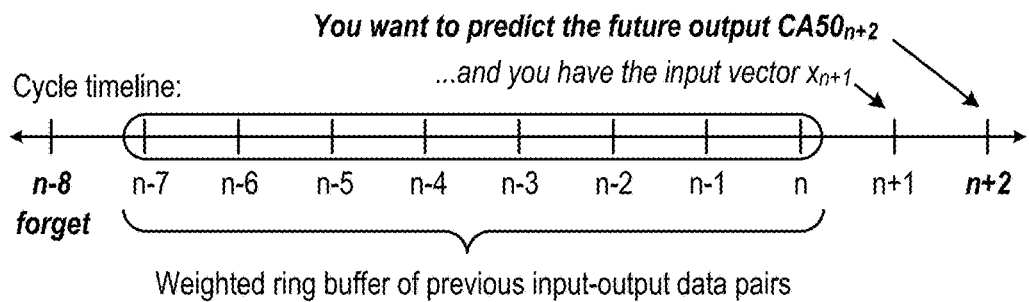
FIG. 4 is a schematic depicting function of the weighted ring buffer in the proposed algorithm.

FIG. 4 gives a schematic representation of this approach. Differences from previous works are that the derivation below lacks a bias vector b, uses the Gaussian distribution for a, drops the unnecessary logistic function exponential negative, and uses a Padé approximant for exp(x). It was found empirically that the computation of the bias b addition step could be removed with no loss of fitting performance if a's elements were drawn from the Gaussian distribution $\mathcal{N}(0,1)$. ELM theory only requires the distribution to be continuous, although the ability to remove the bias is likely problem specific.

The basic goal of an Extreme Learning Machine (ELM) is to solve for the output layer weight vector β that scales the transformed input H to output T:

$$H\beta = T \quad (3)$$

where H is the hidden layer output matrix of a given input matrix and T is the target vector.

For a set n input-output data pairs and $\widetilde{\mathcal{N}}$ neurons at the nth cycle time step, these variables are given by $$H(a, x) = \begin{bmatrix} G(a_1, x_1) & \cdots & G(a_{\widetilde{N}}, x_1) \\ \vdots & \ddots & \vdots \\ G(a_1, x_n) & \cdots & G(a_{\widetilde{N}}, x_n) \end{bmatrix}_{n \times \widetilde{N}} \quad (4)$$

where $G(a_i, x)$ is the neuron activation function, chosen to be a commonly used logistic function, but without the unnecessary negative:

$$G(a_i, x) = \frac{1}{1 + \exp(x \cdot a_i)}. \quad (5)$$

Using a random input weight vector $a_i$ that is composed of random variable (r.v.) samples from a Gaussian distribution for each of the z input variables gives $$a_i = \begin{bmatrix} r.v. \sim \mathcal{N}(0,1) \\ \vdots \\ r.v. \sim \mathcal{N}(0,1) \end{bmatrix}_{z \times 1}. \quad (6)$$

The use of a random $a_i$ that is re-sampled for each of the $\tilde{N}$ individual neurons during initialization is the main difference of an Extreme Learning Machine versus conventional neural networks that iteratively train each $a_i$. These $a_i$ vectors can then be collected into a single input weight matrix a, which is held fixed across all n input row vectors x $$x = [CA90_n \ TI \ SOI \ P_{IVC} \ P_{EVO} \ P_{NVO}]_{n \times z} \quad (7)$$

and n output values $$T = [CA50_{n+1}]_{n \times 1}. \quad (8)$$

Figure 5:
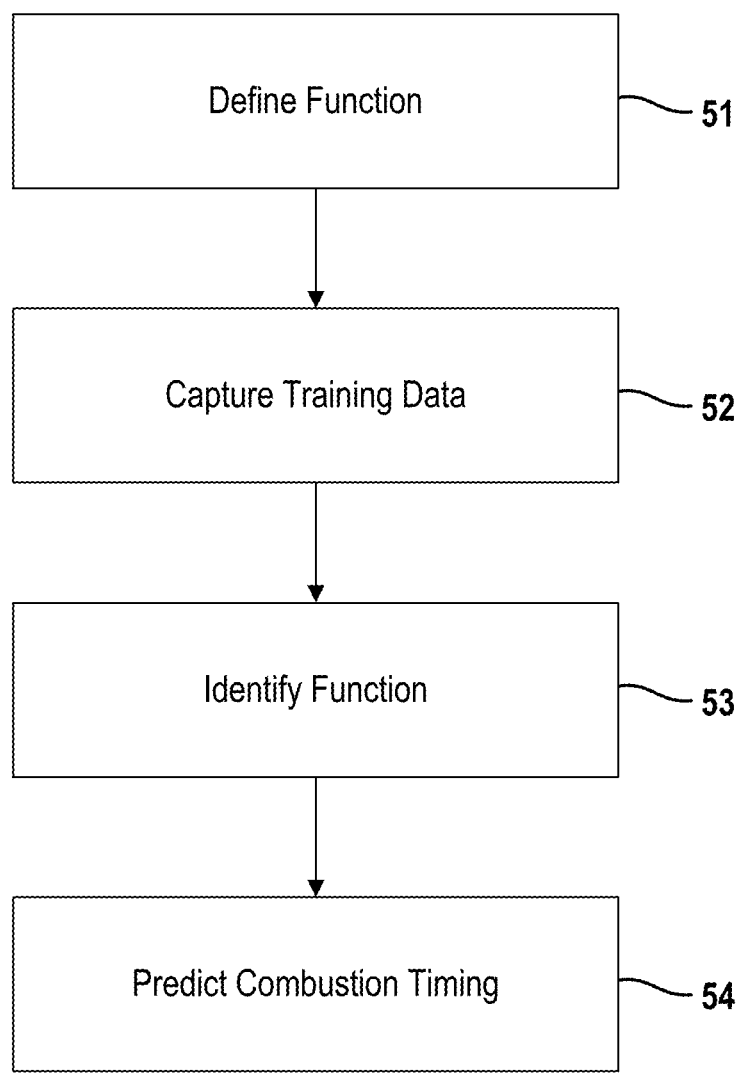
FIG. 5 is a flowchart providing an overview of a method for predicting combustion timing in an internal combustion engine.

This method for predicting combustion timing for an internal combustion engine is summarized in FIG. 5. First, a mapping function is defined for the engine at 51, where the mapping function defines a relationship between one or more inputs and an output associated with the engine. In one embodiment, the output is combustion timing for a given cylinder in the engine at a next combustion cycle and the inputs include combustion timing for the given cylinder in a present cycle and one or more parameters indicative of mixture state and composition from one cycle to the next cycle. Additionally or alternatively, the parameters may be indicative of engine actuator settings (e.g., compression ratio setting in a free piston engine). While reference is made to combustion timing, the inputs and/or output of the mapping function may be defined in terms of other types of combustion features, such as total heat release quantity, pressure rise rate, location of peak pressure, ion current, knock intensity, flame vs. auto ignition fraction, etc. Likewise, it is envisioned that similar mapping functions can be developed for predicting misfire or engine emissions.

More specifically, the inputs in the example embodiment are selected from a group consisting of combustion timing for the given cylinder in the present cycle (e.g., CA90 or CA50), an indicator of fuel injected into the given cylinder in the present cycle (e.g., injection pulse width in milliseconds), crank angle at which fuel injection occurred in the present cycle (e.g., start of injection in crank angle before top dead center) and one or more pressure measures made inside of the given cylinder, such as $P_{IVC}$, $P_{EVO}$ and $P_{NVO}$. In other embodiments, it is envisioned that the mapping function may be defined in terms of more or less of these inputs or different combinations thereof. As noted above, it is also envisioned that the mapping function may be defined in terms of other types of inputs and/or outputs.

Measurements of the inputs and corresponding output are then captured at 52 during varied operating conditions. For example, the training data may be comprised of approximately forty minutes of random engine set points covering 53,884 cycles and 1,179 random engine set points at a single engine speed. In one example embodiment, the x and T columns are scaled between zero and unity for each variable. For this implementation, column variable values below the 0.1% and above the 99.9% percentile were saturated at the respective percentile value, and then normalized between zero and unity between these percentile based saturation limits. This was done to both adequately represent the distribution tails and avoid scaling issues. The random non-linear transformation that enables the low computational complexity of the WR-ELM algorithm may result in ill-conditioned matrices. All numerical implementations should use double precision. Additionally, one should consider using Singular Value Depositions for ill-conditioned matrix inversions.

Using the N(0,1) Gaussian distribution, initialize the $z \times \tilde{N}$ ELM input weights a and hold them fixed for all training/predictions. For the combustion implementation, this was done with MATLAB®'s built-in randn( ) function and the Mersenne Twister pseudo random number generator with seed 7,898,198. An $\tilde{N}$ of 64 was used based on initial trials, and each cylinder's individually computed WR-ELM model used an identical input weight matrix a.

One may then build $H_0(a,x_0)$ from previously acquired samples that cover a wide range of conditions with Eq. 4 using an input matrix $x_0$ and output target vector $T_0$ (the formats of these are given in Eqs. 7 and 8, respectively). In one example implementation, the initial training data were ~40 minutes of random engine set points covering 53,884 cycles and 1,179 random engine set points at a single engine speed; however, it appears that only ~20 minutes of data may be sufficient. Pruning the training data to only include ~6 cycles before and ~9 cycles after a transient set point step provided a small model fitting performance improvement.

Returning to FIG. 5, the mapping function is then identified at 53 using the captured training data. In one embodiment, a vector is determined that scales the inputs of the mapping function to the output of the mapping function using a least squares method. More specifically, solve for $\beta_0$ in equation 24 using Extreme Machine Learning. Once identified, combustion timing of the given cylinder in the next cycle can be predicted at 54 using the identified mapping function. It is understood that other types of methods besides least squares can also be used within the broader aspects of this disclosure.

While the above logistic works well, one modification improves the computational efficiency on processors without a dedicated exp(x) instruction, such as the Raspberry Pi®. The modification is to replace the exponential with the following Padé approximant:

$$\exp(y) \approx p(y) = \frac{120 + 60y + 12y^2 + y^3}{120 - 60y + 12y^2 - y^3}, \quad (9)$$

which has the following simple logistic relations:

$$\frac{1}{1 + \exp(y)} \approx \frac{1}{1 + p(y)} = \frac{(120 + 12y^2) - 60y - y^3}{2 \cdot (120 + 12y^2)} \quad (10)$$

The small number of floating point operations used, reused intermediate terms, known boundedness of the normalized inputs, and known a weights make this approximant work well in this application. No significant degradation in model performance was found, and as such it is used in all implementations described hereafter.

The normal equations can then be used to solve for the least squares solution β of Eq. 3 with $$\beta = (H^T H)^{-1} H^T H. \quad (11)$$

To extend this to a weighted least square solution, one can incorporate a diagonal weight matrix W to the normal equations:

$$\beta = (H^T W H)^{-1} H^T W T. \quad (12)$$

The solution can then be split between an offline and online "chunk" of recent input-output data pairs to avoid both the computational and storage burden of using offline data directly. To do this, the matrices are partitioned with subscript 0 and 1 denoting the offline and online updated components, respectively:

$$H = \begin{bmatrix} H_0 \\ H_1 \end{bmatrix}_{n \times \tilde{N}}, \quad W = \begin{bmatrix} W_0 & 0 \\ 0 & W_1 \end{bmatrix}_{n \times N}, \quad T = \begin{bmatrix} T_0 \\ T_1 \end{bmatrix}_{n \times 1} \quad (13)$$

Then, following a similar derivation for recursive least squares but adding the weight matrix, the inversion portion $H^T W H$ of the weighted normal equations Eq. 12 can be written in terms of $K_0$ and $K_1$:

$$K_1 = \quad (14)$$
$$= H^T W H$$
$$= \begin{bmatrix} H_0 \\ H_1 \end{bmatrix}^T \begin{bmatrix} W_0 & 0 \\ 0 & W_1 \end{bmatrix} \begin{bmatrix} H_0 \\ H_1 \end{bmatrix}$$
$$= [H_0^T \ H_1^T] \begin{bmatrix} W_0 & 0 \\ 0 & W_1 \end{bmatrix} \begin{bmatrix} H_0 \\ H_1 \end{bmatrix}$$
$$= H_0^T W_0 H_0 + H_1^T W_1 H_1$$
$$= K_0 + H_1^T W_1 H_1$$

The non-inverted portion of the normal equations can similarly be rewritten using existing relations:

$$H^T W T = \quad (15)$$
$$= \begin{bmatrix} H_0 \\ H_1 \end{bmatrix}^T \begin{bmatrix} W_0 & 0 \\ 0 & W_1 \end{bmatrix} \begin{bmatrix} T_0 \\ T_1 \end{bmatrix}$$
$$= [H_0^T \ H_1^T] \begin{bmatrix} W_0 & 0 \\ 0 & W_1 \end{bmatrix} \begin{bmatrix} T_0 \\ T_1 \end{bmatrix}$$
$$= [H_0^T W_0 \ H_1^T W_1] \begin{bmatrix} T_0 \\ T_1 \end{bmatrix}$$
$$= H_0^T W_0 T_0 + H_1^T W_1 T_1$$
$$= K_0 K_0^{-1} H_0^T W_0 T_0 + H_1^T W_1 T_1$$
$$= K_0 \beta_0 + H_1^T W_1 T_1$$
$$= (K_1 - H_1^T W_1 H_1)\beta_0 + H_1^T W_1 T_1$$
$$= K_1 \beta_0 - H_1^T W_1 H_1 \beta_0 + H_1^T W_1 T_1$$

Substituting Eq. 15 into the full online solution $$\beta_1 = \quad (16)$$
$$= (K_1^{-1})(H^T W T)$$
$$= \beta_0 - K_1^{-1} H_1^T W_1 H_1 \beta_0 + K_1^{-1} H_1^T W_1 T_1$$
$$= \beta_0 + K_1^{-1} H_1^T W_1 (T_1 - H_1 \beta_0)$$

yields the online solution without the need for the offline dataset. To trade the computational burden of the $\tilde{N} \times \tilde{N}$ sized K inverse for an inverse that scales with a smaller sized ring buffer, one can let $P = K^{-1}$ $$P_0 = K_0^{-1} = (H_0^T W_0 H_0)^{-1} \quad (17)$$

$$P_1 = K_1^{-1} = (P_0^{-1} + H_1^T W_1 H_1)^{-1} \quad (18)$$

and use the matrix inversion lemma on Eq. 18 to yield:

$$P_1 = P_0 - P_0 H_1^T (W_1^{-1} + H_1 P_0 H_1^T)^{-1} H_1 P_0 \quad (19)$$

Unlike OS-ELM and WOS-ELM, additional simplification is possible because the WR-ELM algorithm does not propagate $P_1$ in time. To begin, append the $H_1^T W_1$ portion of Eq. 16 to Eq. 19 and distribute $H_1^T$ to give:

$$P_1 H_1^T W_1 = [P_0 H_1^T - P_0 H_1^T (W_1^{-1} + H_1 P_0 H_1^T)^{-1} \cdot H_1 P_0 H_1^T] W_1 \quad (20)$$

Eq. 20 can then be simplified with the substitutions $A = P_0 H_1^T$, $B = H_1 A$ and then distributing $W_1$ to provide:

$$P_1 H_1^T W_1 = A[W_1 - (W_1^{-1} + B)^{-1} B W_1] \quad (21)$$

Transforming Eq. 21 with the identity $(X+Y)^{-1} = X^{-1}(X^{-1} + Y^{-1})^{-1}$ gives:

$$P_1 H_1^T W_1 = A[W_1 - W_1(W_1 + B^{-1})^{-1} W_1] \quad (22)$$

Eq. 22 is then in a form where the identity $X - X(X+Y)^{-1} X = (X^{-1} + Y^{-1})^{-1}$ can be applied to yield a substantially simpler form with a ring buffer sized inverse:

$$P_1 H_1^T W_1 = A(W_1^{-1} + B)^{-1} \quad (23)$$

Finally, noting that $P_1 H_1^T W_1 = K_1^{-1} H_1^T W_1$, one can then substitute Eq. 23 into Eq. 16 and arrive at the following algorithm summary:

Offline Training $$P_0 = [(H_0^T W_0 H_0)^{-1}]_{\tilde{N} \times \tilde{N}}$$

$$\beta_0 = [P_0 H_0^T W_0 T_0]_{\tilde{N} \times 1} \quad (24)$$

Online Adaptation $$A = P_0 H_1^T, B = H_1 A$$

$$\beta_1 = \beta_0 + A(W_1^{-1} + B)^{-1}(T_1 - H_1 \beta_0) \quad (25)$$

Online Predictions $$CA50_{n+2} = T_{n+1} = H(a, x_{n+1}) \beta_1 \quad (26)$$

It should be noted that only $P_0$ and $\beta_0$ are needed for online adaptation, and the size of these matrices scales only with an increasing number of neurons $\tilde{N}$. None of the original offline data is needed. Additionally, note that Eq. 26 is simply the reverse of Eq. 3 with the most recent $x_{n+1}$ cycle vector and $\beta_1$ updated from the weighted ring buffer. Finally, it should be mentioned that the resulting update law Eq. 25 is structurally similar that of the steady-state Kalman filter, which also uses recursive least squares.

Figure 6:
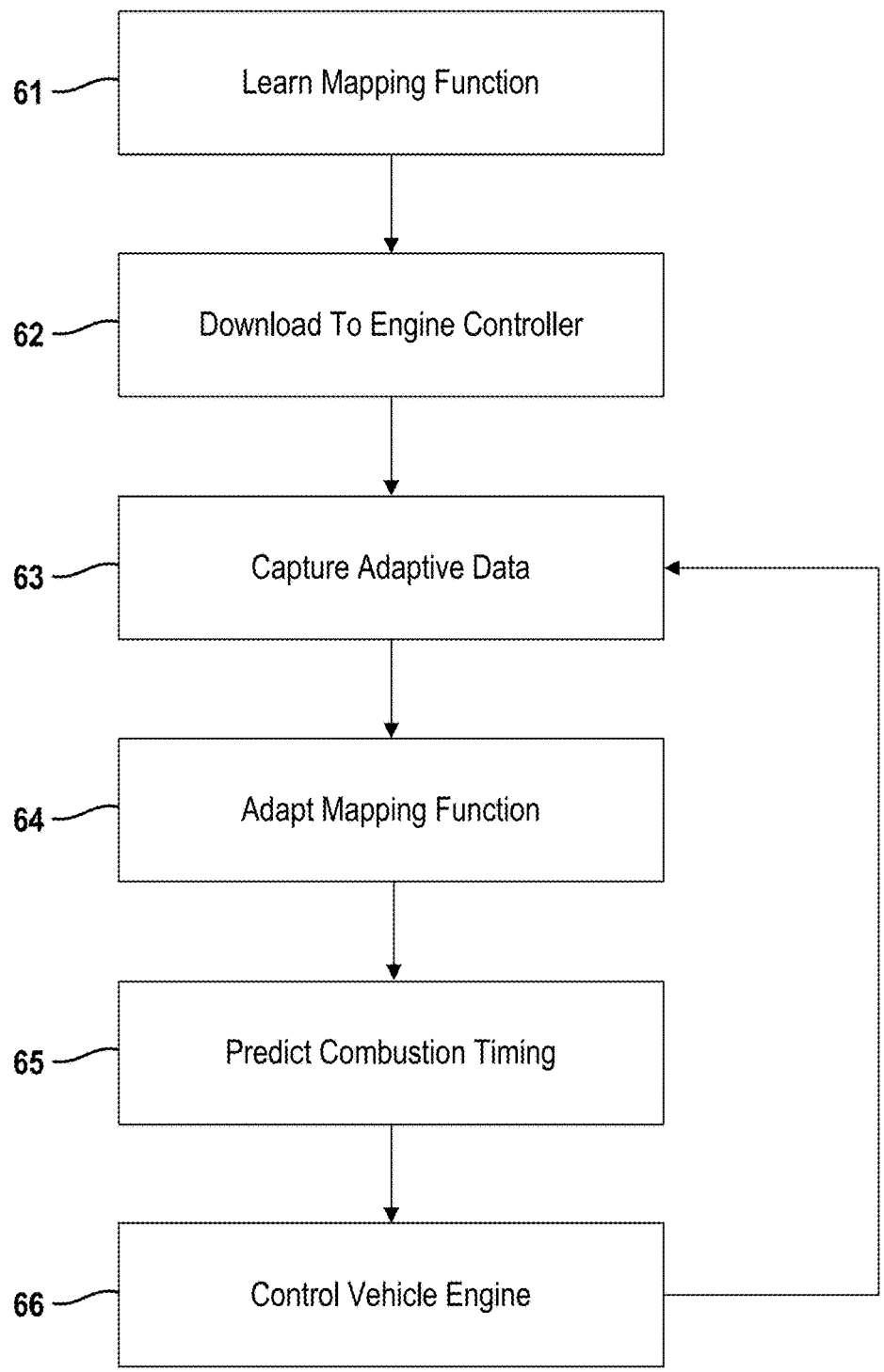
FIG. 6 is a flowchart providing an overview of a method for controlling an internal combustion engine in real time on a cycle-by-cycle basis.

With reference to FIG. 6, this improved method for controlling an internal combustion engine is summarized. First, the mapping function (i.e., $\beta_0$) for the engine is learned at 61, for example in the manner described above in relation to FIG. 5. The mapping function is preferably learned offline and subsequently transferred at 62 to a data store associated with a controller, for example residing in a vehicle. In addition to the mapping function, the training data used to identify the mapping function is downloaded and maintained in the data store associated with the controller.

Data which can be used to adapt the mapping function is then captured at 63. In one embodiment, a buffer is populated with adaptive data, where the adaptive data are measures of the inputs and the output of the mapping functions during a number of recent operating cycles of the cylinder to be controlled. For example, a ringer buffer of size r is populated with recently completed input-output pairs using:

$$\text{input ring buffer} = x_1 = \begin{bmatrix} x_{n-r+1} \\ \vdots \\ x_n \end{bmatrix}_{r \times z} \quad (27)$$

$$\text{output ring buffer} = T_1 = \begin{bmatrix} CA50_{n-r+2} \\ \vdots \\ CA50_{n+1} \end{bmatrix}_{r \times 1}$$

Then execute the WR-ELM update algorithm between combustion cycle n+1 and n+2 as shown in FIG. 4. For the combustion implementation, r was taken to be 8 cycles after tuning with existing datasets. In other embodiments, r can vary cycle-to-cycle.

Next, the mapping function can be adapted at 64. As with the offline data, build $H_1$ (a,$x_1$) with Eq. 4 using an input matrix $x_1$ and output target vector $T_1$. A weight matrix $W_0$ is specified for offline measurements. For this implementation, a simple scalar value $W_0=3.5\times10^{-3}$ was chosen using a design of experiments. Note that $W_0$ allows weighting to be applied offline and that a small offline weighting is equivalent to a large online weighting. A weight matrix $W_1$ is also specified for the adaptive data. For the combustion implementation, the identity matrix ($W_1$=I) was chosen since weighting was already applied to the offline data. Gradually increased weighting on the most recent time steps in the ring buffer was explored; however, it did not net a significant improvement to model fitting performance over a simple scalar value on offline data. It is also envisioned that $W_1$ can vary cycle-to-cycle. Solve for the updated $\beta_1$ solution using Eq. 25.

Combustion timing for a cylinder is predicted at 65. In the example, embodiment, after cycle n+1's input vector $x_{n+1}$ is fully populated, transform vector into $H_{n+1}$ using Eq. 4 and solve for a predicted target value $T_{n+1}$ or $CA50_{n+2}$ using Eq. 26. It is readily understood that this technique can be employed to predict timing across multiple cylinders.

Beyond simply predicting a single cycle ahead, one may iterate the mapping function to predict more than one cycle ahead. Iterating is accomplished by taking the predicted output and using it as an input to a subsequent prediction. Iterating in this manner may require additional assumptions and models (derived from physics or with machine learning) to provide all the necessary inputs to iterate and predict more than one cycle ahead.

Lastly, the engine is then controlled at 66 based in part on the predicted combustion timing for one or more cylinders as further described below. Steps 63-66 are repeated for each subsequent combustion cycle. Results (e.g., hidden layer outputs) from previous cycles are preferably cached by the controller to reduce computational requirements.

To demonstrate proof of concept control with real-time implementation, a one-step-ahead Model Predictive Control (MPC) law was explored with SOI as a control actuator:

$$f(SOI) - \text{target } CA50 = 0 \quad (28)$$

where f(SOI) is the cycle-to-cycle adapted WR-ELM mapping function CA50 prediction for the current input vector as a function SOI. Eq. 28 was solved with Newton's Method:

$$SOI_{n+1} = SOI_n - \frac{f(SOI_n) - \text{target } CA50}{f'(SOI_n)} \quad (29)$$

Out of concern for algorithm convergence within a finite, real-time computation window, three initial $SOI_n$ values were used. These initial values were the previous SOI value, ¼ the normalized SOI range, and ¾ the normalized SOI range. Also out of concern for convergence, the final selected SOI value was not the final iterated value. The selected SOI value was whichever iteration most closely satisfied Eq. 28. Experimentally, these convergence concerns did not appear to be an issue, but the multiple initial values code was active for all experiments. SOI actuator constraints were enforced with simple saturation; however, future work should include the constraints in the MPC optimization. For performance reasons, the above control laws were programmed in C code that manually traversed the WR-ELM matrices in a fused loop that calculated the analytical SOI derivative and predicted CA50. It is readily envisioned that other types of control schemes, such as a PID controller or gradient descent with a multi-objective cost function and multiple actuators (e.g., using a spark, adjusting compression ratio, adjusting valve timing, varying the mixture of fuel types, using multiple injections, etc.), can also be implemented for real-time control using the predictive output from the algorithms set forth herein. Additionally, such schemes can be readily extended to predict and control more than one cycle ahead.

A collection of unoptimized MATLAB® software routines was developed using the techniques described in the previous sections. The offline solution provided by Eq. 24 was solved at an average rate of 1.1 μs per combustion cycle per cylinder on an Intel® i7 860 2.8 GHz desktop computer running Gentoo GNU/Linux®. The online predictions from Eqs. 25, 27 and 26 were recast into a parfor loop that automatically parallelized the code across four worker threads to provide predictions at an average rate of 66 μs per combustion cycle per cylinder. This level of performance is more than adequate for real-time.

Figure 7:
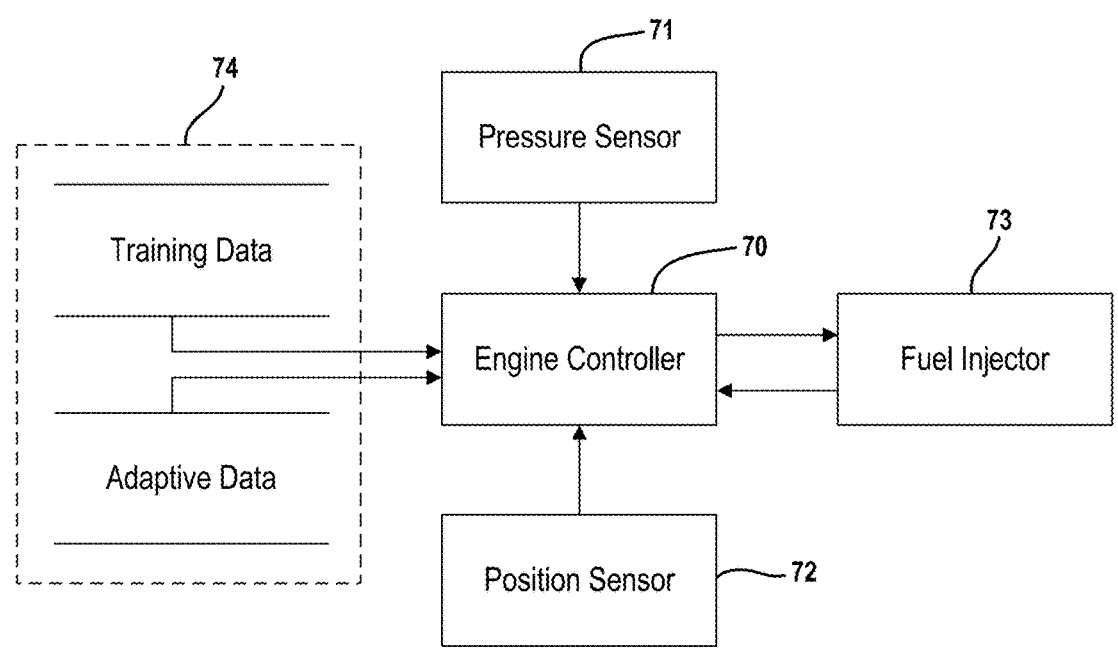
FIG. 7 is a diagram depicting an example embodiment of an engine controller in a vehicle.
Figure 8A:
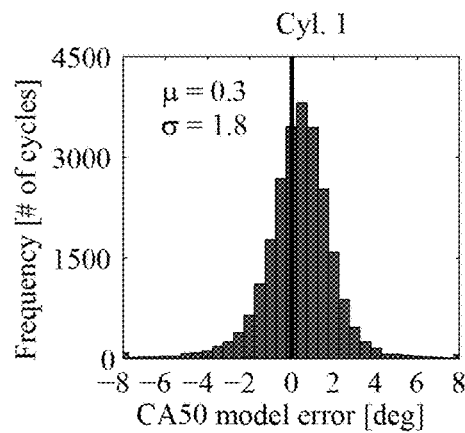
FIGS. 8A-8D are error histograms for WR-ELM model of Eq. 3 across 25,323 consecutive cycles with random transient steps occurring approximately every 0.5-10 seconds and occasional misfires.
Figure 8B:
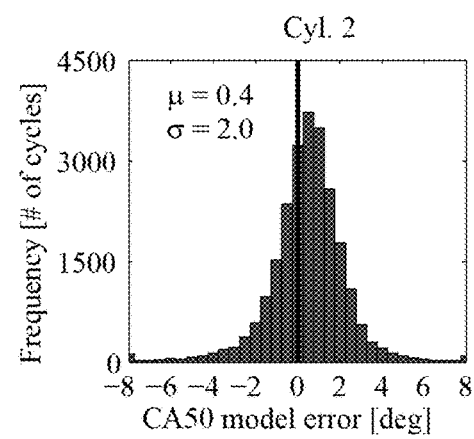
Figure 8C:
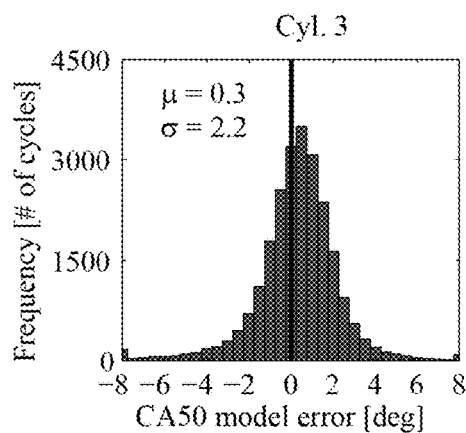
Figure 8D:
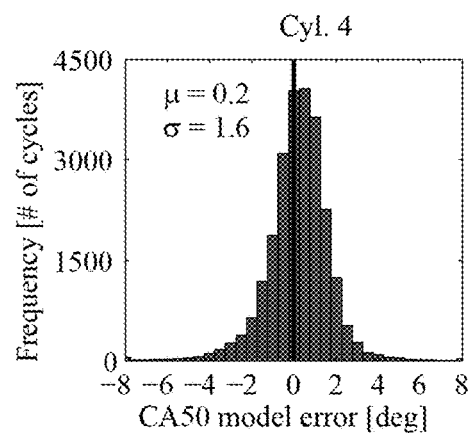
Figure 9A:
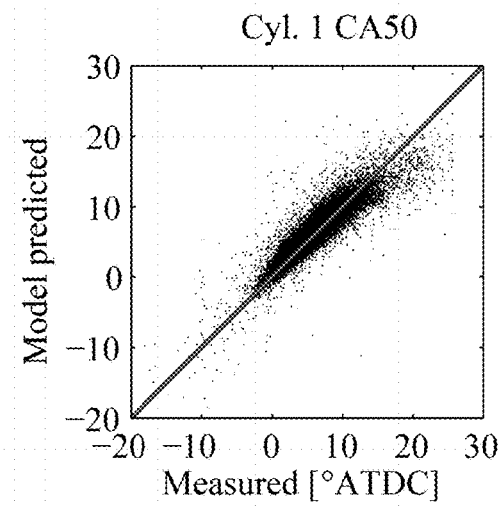
Figure 9B:
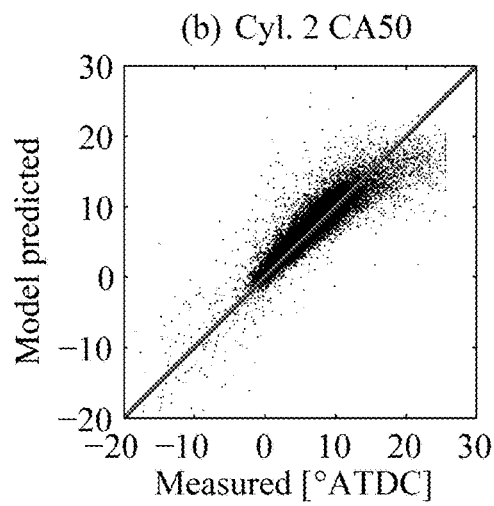
Figure 9C:
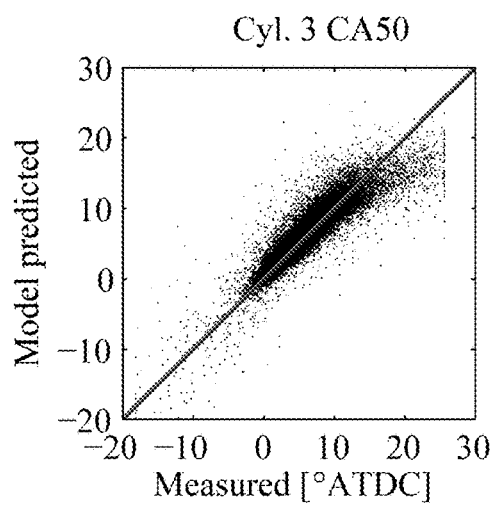
Figure 9D:
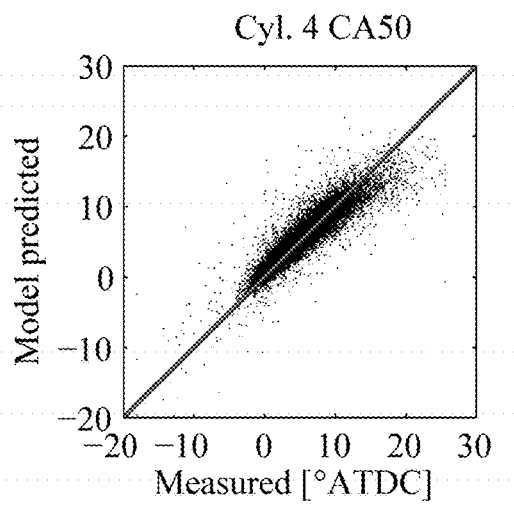

FIG. 7 depicts an engine controller 70 implementing the control method set forth above. In an example embodiment, the engine controller is implemented using custom, 18-bit Raspberry Pi® data acquisition hardware. The engine controller receives input signals from a pressure sensor 71, a position sensor 72 and one or more fuel injectors 73 associated with the engine. The engine controller 70 is also able to control the fuel injectors 73 as well as access a data store 74. Training data and adaptive data may be stored in the data store 74. In the example embodiment, the internal combustion engine has one or more pistons driven by a crankshaft.

It is envisioned that control algorithms described herein are applicable to engines without pistons and/or crankshafts, such as a rotary Wankel-like engine or a free piston engine.

In the example embodiment, the control methods are implemented as software executed by the engine controller 70. In one implementation, the software for this system is comprised of: a PREEMPT_RT patched Linux® kernel with minor patches to completely disable Fast Interrupt request (FIQ) usage by the USB driver; ARM assembly code for high-speed pressure data acquisition using the FIQ (up to ~240 kilosamples per second, total all cylinder channels); C code Linux® kernel module that contains the FIQ assembly code with page-based memory allocation and standard mmap, ioctl, and fasync hooks to Linux® user space; and a multi-threaded Linux® user space application that runs heat release calculations and WR-ELM. This software leverages the Eigen C++ matrix library and a custom assembly code matrix multiply for the Raspberry Pi 1's VFPv2 double precision floating point unit. Asynchronous fasync notification is used for specific crank angle events published from the FIQ code to synchronize the user space software's execution against the crank's rotation. The software further includes a low-priority second user space thread that uses standard WebSockets from the libwebsockets C code library to stream processed data to a web-based user interface coded in JavaScript with the d3.js library and a minimal Raspbian GNU/Linux® distribution. After the adaptation routine is run, it is possible to perform 11 model predictive control predictions within a measured worst case task context switch and calculation latency window of ~300 μs. This level of real-time performance is needed to ensure control authority with the SOI actuator immediately after $P_{NVO}$ is measured.

Table 1 below provides a summary of the experimental setup and conditions visited. In-cylinder pressure was acquired on a 1.0° CA basis and pegged thermodynamically for each cycle after IVC using a polytropic exponent of 1.35. This exponent was chosen to most closely match the pegging results achieved using the single intake runner high speed pressure sensor on cylinder 1. For the purpose of computing cycle-to-cycle net Indicated Mean Effective Pressure (IMEP), a cycle was defined as starting at 360° BTDC firing and ending at 359° ATDC firing. The reference cam lift for timing and duration in Table 1 is 0.5 mm. The air-fuel ratio range indicated in Table 1 was measured post-turbine, and represents a mixture from all four cylinders. Fuel mass per cycle was estimated using the fuel's lower heating value, assuming that the gross heat release was 20% greater than the net heat release, and that the combustion efficiency was 100%.

TABLE 1

Experimental setup and test conditions

| Engine | |
|---|---|
| Make/model | GM/LNF Ecotec |
| Cylinder layout | in-line 4 |
| Overall displacement | 2.0 L |
| Bore/stroke | 86/86 mm |
| Geometric compression ratio[a] | 11.2:1 |
| Cam lift[a] | 3.5 mm |
| Cam duration[a] | 93° CA |
| Cam phaser type | hydraulic |
| Fuel injector type | direct, side mounted, wall guided |
| Fuel | |
| Designation | Haltermann HF0437, EPA Tier II EEE |

TABLE 1-continued

Experimental setup and test conditions

| Description | U.S. Federal Emission Cert. Gasoline |
|---|---|
| Research Octane Number | 97.0 |
| Motor Octane Number | 88.1 |
| ASTM D240 heating value | 42.8 MJ/kg |
| Aromatic/olefin/saturate fractions | 28/1/71% volume |
| Test conditions | |
| Throttle position | wide open |
| Turbocharger | wastegate open |
| Supercharger | bypassed |
| Residual retention strategy | negative valve overlap |
| IVO set point range[b] | 78.6/128° ATDC |
| EVC set point range[b] | −118/−83.0° ATDC |
| SOI set point range[b] | 272/378° BTDC |
| TI set point range[b] | 0.582/1.01 ms |
| Net IMEP values visited[b] | 1.85/3.62 bar |
| Air-fuel ratios visited[b] | 0.90/1.6 |
| Estimated fuel per cycle[b] | 6/11 mg |
| Intake runner temps., all cyls. | $\mu$ = 52.6° C., $\sigma$ = 1.6° C. |
| Fuel injection pressure | $\mu$ = 70.0 bar, $\sigma$ = 0.85 bar |
| Coolant temperature | $\mu$ = 89.5° C., $\sigma$ = 3.4° C. |
| Engine speed | $\mu$ = 2,500 RPM, $\sigma$ = 6 RPM |

[a]Modified from stock engine
[b]First to 99th percentile

The full collection of 129,964 cycles is comprised of five ~20 minute random test subsequences. Each random subsequence covers the same nominal ranges listed in Table 1; however, one subsequence holds SOI fixed. The sequence with SOI fixed is only used as part of FIG. 2, and not during the model training and testing presented here. Total cycle counts are reported after outliers are removed. To this end, cycles were classified as outliers if they met any of the following criteria: a misfire had occurred with a $Q_{net}$<50 J; a linear, least squares fit of the tail of the cumulative heat release curve between 50 and 60°ATDC had an absolute slope that was greater than 3 J/°CA; and a cycle was preceded by a cycle that met either of the two criteria above. These criteria were chosen because the chosen mapping function depends on reliably knowing the previous cycle's combustion timing. Note that the outlier criteria do not distinguish between misfires and partial burns. These criteria are fairly permissive and remove only ~3% of the data.

The offline solution was trained using ~40 minutes of test cell time covering 53,884 cycles and 1,179 random engine set points at 2,500 rpm (two random subsequences). These subsequences are comprised of random, transient set point steps occurring approximately every 0.5-10 seconds with occasional misfires covering the nominal variable ranges given in Table 1. The training data was pruned to only include 6 cycles before and 9 cycles after a transient set point step for a small model fitting performance improvement. The online solution was run with a separate random subsequence and fed unseen cycles one-by-one, similar to what would be experienced in a real-time implementation. This online dataset is comprised of 25,323 consecutive cycles with 521 random engine set points. Longer online sequences are also tested, and achieved similar results.

The fitting performance on a 25,323 cycle dataset (excluding outliers) is shown in Table 2 and in FIG. 8-10. The minimum coefficient of determination ($R^2$) given in Table 2 shows that at least 80% of the cycle-to-cycle variance can be explained by the model as it is currently defined for a dataset with random transient steps occurring approximately every 0.5-10 seconds and occasional misfires. Steady-state Root Mean Squared Error (RMSE) in Table 2 was assessed at a single set point with a mean CA50 of 3.9° ATDC and a net Indicated Mean Effective Pressure (IMEP) of 2.8 bar before the transient sequence started.

TABLE 2

WR-ELM model of Eq. 2 error statistics

| Cylinder # | Overall[c] $R^2$ | Overall RMSE [° CA] | Steady-State RMSE [° CA] |
|---|---|---|---|
| 1 | 0.81 | 1.85 | 0.84 |
| 2 | 0.81 | 2.06 | 0.97 |
| 3 | 0.80 | 2.17 | 0.97 |
| 4 | 0.83 | 1.64 | 0.86 |

Figure 10A:
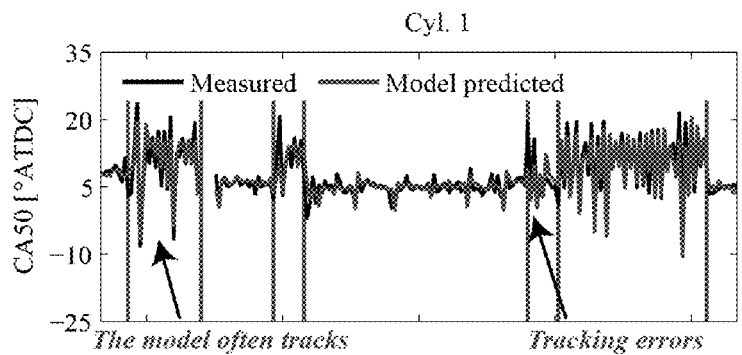
Figure 10B:
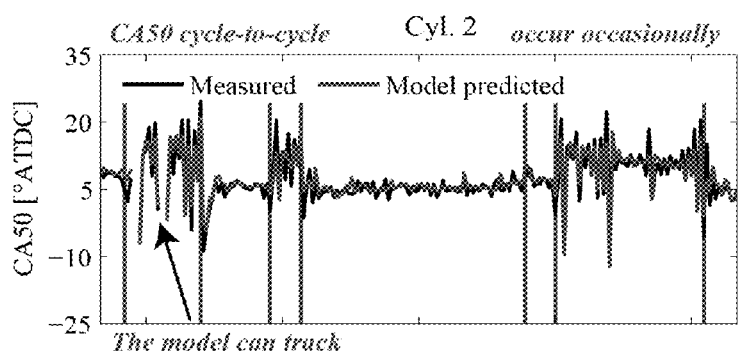
Figure 10C:
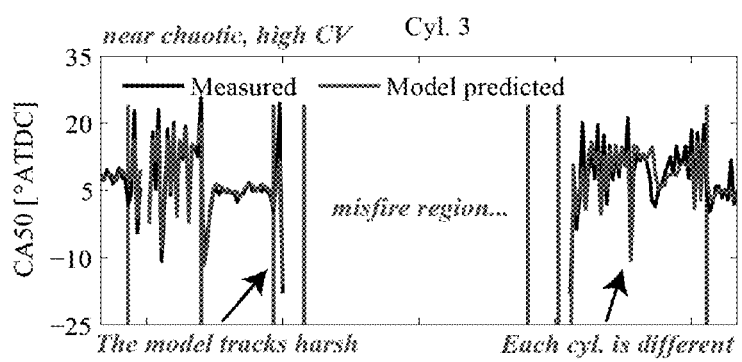
Figure 10D:
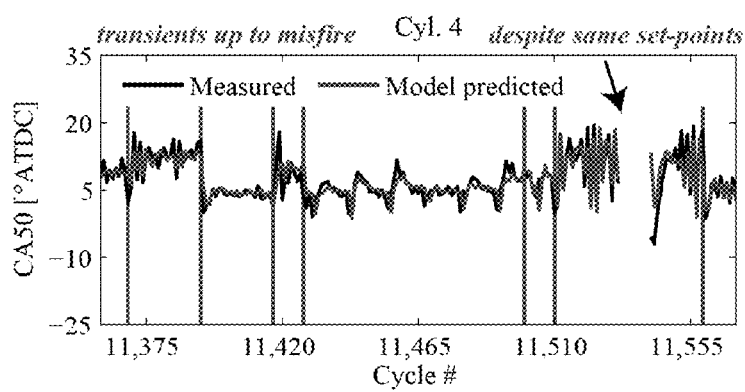
Figure 10E:
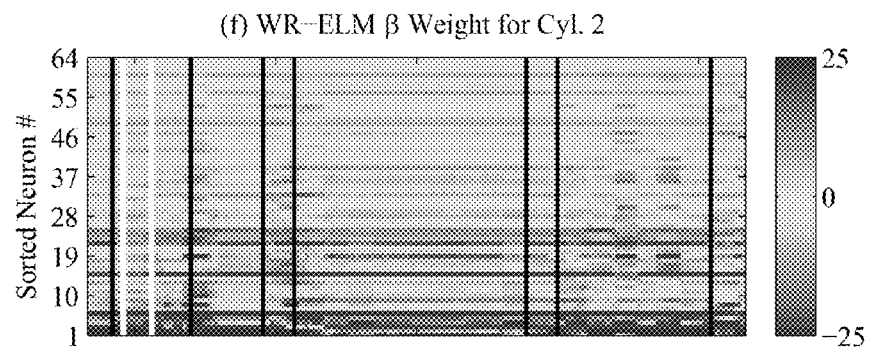
Figure 10F:
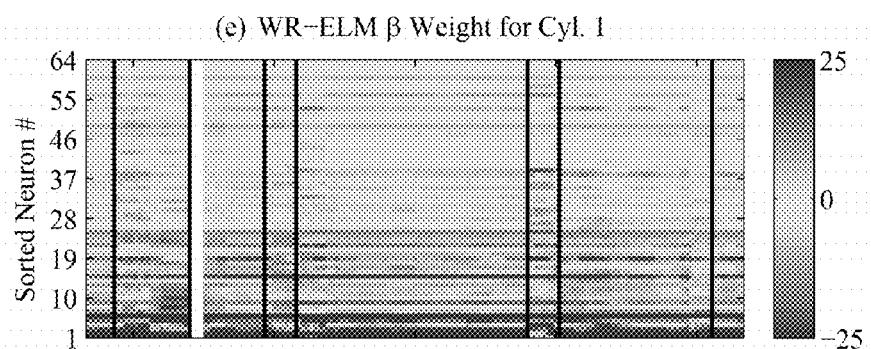
Figure 10G:
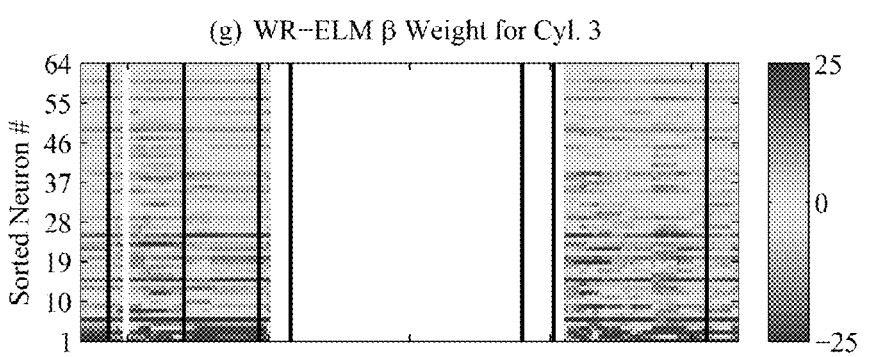
Figure 10H:
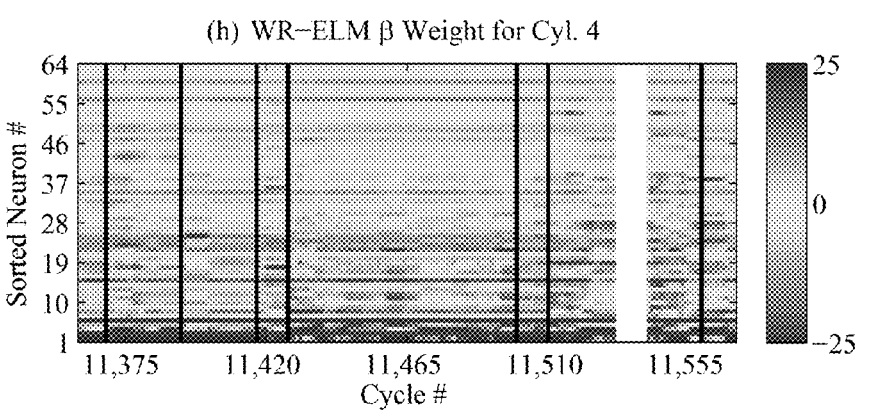
Figures 10I, 10J, 10K, 10L:
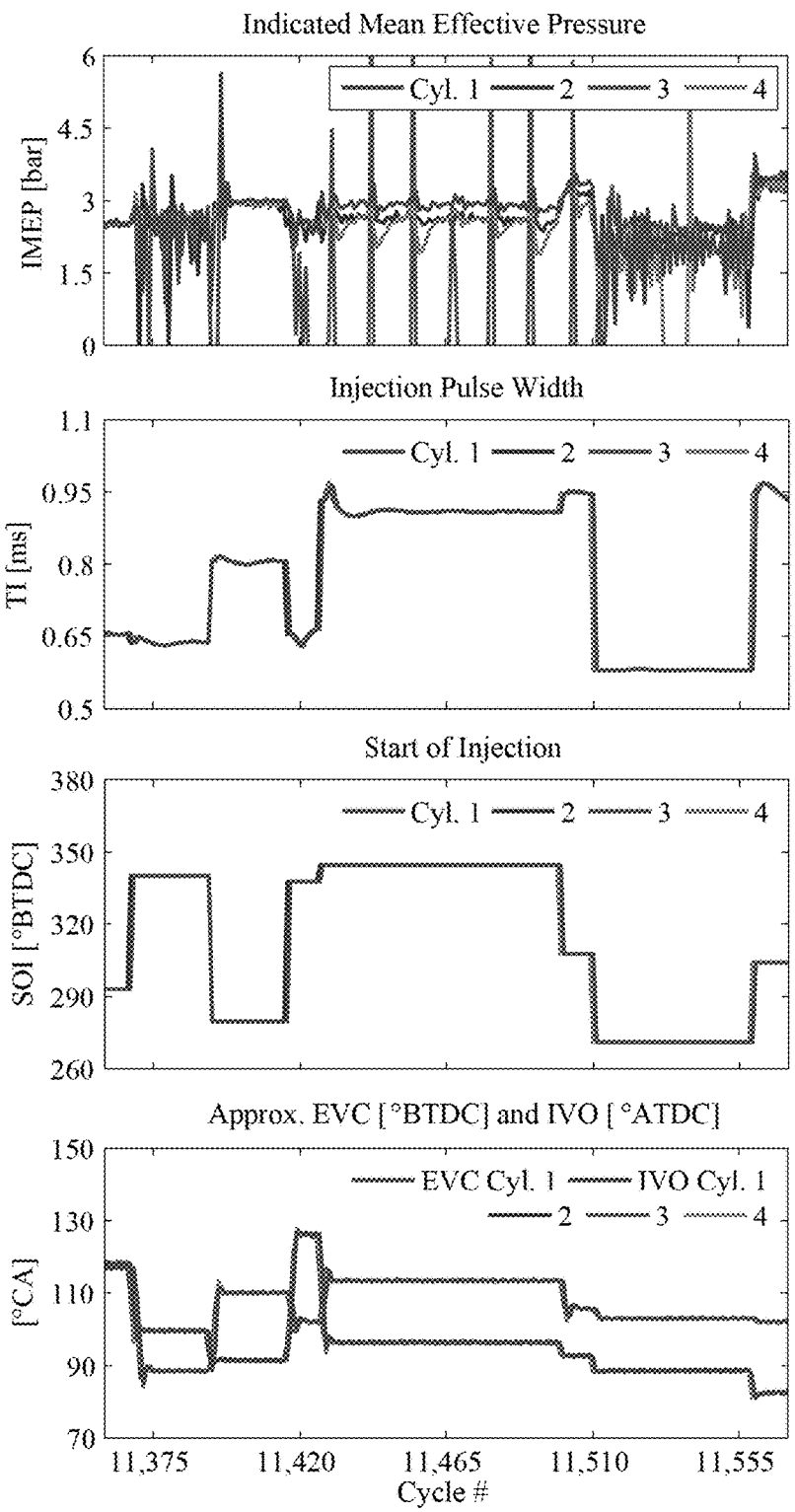

FIG. 8 shows the distribution of model errors. It is clear that there is a slight positive bias to the predictions. FIG. 9 provides insight into the tails of FIG. 8 and shows that model errors still generally capture the correct directionality. FIG. 9 also shows that late combustion timing is under predicted and that the positive bias is largely from the midrange values of CA50. FIG. 10A-10D shows the cycle-to-cycle time series predictions, which can be computed as early as 358° BTDC firing. Missing segments are the outliers described earlier. FIGS. 10E-10H provide qualitative insight into the model's $\beta_1$ weights under online adaptation. The neurons are sorted by the 2-norm of their respective input weight vector $a_i$. The same non-linear transformation specified by a is used for each cylinder, and any cylinder-to-cylinder differences in the cycle-to-cycle $\beta_1$ are due to different characteristics of each cylinder. FIG. 10I shows the IMEP and FIGS. 10J-10L shows the random engine actuator inputs that are driving each engine set point transient.

The model predictions of FIGS. 10A-10D generally show good agreement; however, there are occasional tracking errors. Overall, however, the authors believe the level of fit shown in Table 2 and in FIGS. 8-10 is very good considering that the dataset includes both transients and operating points with high CV, right up to complete engine misfire.

This disclosure presents a new online adaption algorithm named Weighted Ring-Extreme Learning Machine. The approach uses a weighted ring buffer data structure of recent measurements to recursively update an online trained Extreme Learning Machine solution. It is shown that WR-ELM can be used to approximate the combustion mapping function developed and provide reasonably accurate, causal predictions of near chaotic combustion behavior. In this application only in-cylinder pressure and crank encoder sensors are needed for predictions, and these predictions can be computed as early as 358° BTDC firing. The algorithm is fast, and has been implemented in real-time on the low-cost Raspberry Pi® platform.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes (e.g., using field programmable grid arrays) or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memories, magnetic or optical cards, application specific integrated circuits, or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling an internal combustion engine on a cycle-by-cycle basis, comprising:
   (a) providing, by a controller, a mapping function which defines a relationship between inputs and an output associated with the internal combustion engine, where the output is a given combustion feature of a given cylinder in the engine at a next cycle and the inputs include the given combustion feature of the given cylinder in a present combustion cycle and parameters indicative of mixture state and composition or engine actuator settings from one cycle to the next cycle;
   (b) maintaining, by the controller, training data used to identify the mapping function in a data store associated with the controller, where the training data is measures of the inputs and the outputs of the internal combustion engine over a range of operating conditions;
   (c) populating, by the controller, a buffer with adaptive data for the given cylinder in the present combustion cycle, where the adaptive data are measures of the inputs and the output of the mapping function that were captured during m most recent combustion cycles of the given cylinder;
   (d) combining, by the controller, the training data with the adaptive data to form a combined data set, where the training data excludes the adaptive data;
   (e) identifying, by the controller, the mapping function from the combined data set using a weighted least squares method;
   (f) predicting, by the controller, the given combustion feature of the given cylinder in the next cycle using the mapping function and measures of the inputs during the present cycle;
   (g) controlling, by the controller, the engine by actuating fuel injectors or another actuator in the engine based in part on the predicted combustion feature of the given cylinder in the next cycle; and
   (h) repeating steps c) - g) for subsequent combustion cycles of the internal combustion engine.

2. The method of claim 1 wherein the given combustion feature is selected from a group consisting of combustion timing, combustion duration, total heat release quantity, pressure rise rate, location of peak pressure, ion current, knock intensity, and flame vs. auto ignition fraction.

3. The method of claim 1 wherein the engine has one or more pistons driven by a crankshaft, the output for the mapping function is defined as combustion timing of the given cylinder in the next cycle, and the inputs for the mapping function being selected from a group consisting of combustion timing of the given cylinder in present cycle, an indicator of fuel injected into the given cylinder in the present cycle, crank angle(s) at which fuel injection occurred in the present cycle and one or more pressure measures made inside the given cylinder.

4. The method of claim 1 wherein providing a mapping function further comprises
   defining the mapping function, wherein the inputs of the mapping function are selected from a group consisting of combustion timing of the given cylinder in present cycle, an indicator of fuel injected into the given cylinder in the present cycle, crank angle at which fuel injection occurred in the present cycle and one or more pressure measures made inside the given cylinder;
   capturing measurements of the inputs during a present cycle and corresponding combustion timing of the given cylinder at the next cycle while varying operating conditions of the engine;
   storing the captured measurements of the inputs and the output as the training data;
   determining a matrix that scales one or more transformations of the inputs of the mapping function to the output of the mapping function using a least squares method, such that the matrix serves as the mapping function for the engine; and
   downloading the training data into the data store associated with the controller.

5. The method of claim 1 wherein populating a buffer further comprises capturing measures of pressure inside the given cylinder during the recent operating cycles.

6. The method of claim 1 wherein the buffer is further defined as a ring buffer.

7. The method of claim 1 wherein identifying the mapping function further comprises machine learning the mapping function with a single-hidden layer feedforward neural network with randomly chosen weights for each of the hidden nodes in the neural network.

8. The method of claim 1 further comprises repeating steps (c) - (g) for subsequent combustion cycles in the engine.

9. The method of claim 1 wherein controlling the engine further comprises determining crank angle at which to inject fuel during the next cycle in accordance with $$SOI_{n+1} = SOI_n - \frac{f(SOI_n) - \text{target } CA50}{f'(SOI_n)}$$

where $SOI_n$ is crank angle at which fuel injection occurred in the present cycle, $f(SOI_n)$ is the adapted mapping function as a function of SOI while holding other inputs fixed, $f'(SOI_n)$ is the derivative of $f(SOI_n)$ with respect to SOI, and target CA50 is the desired combustion timing of the given cylinder in the next cycle.

10. The method of claim 1 wherein controlling the engine further comprises determining crank angle at which to inject fuel during the next cycle using gradient descent with multiple actuators.

11. A method for predicting combustion timing of an internal combustion engine, the engine having two or more pistons driven by a crankshaft, comprising:
   defining, by a controller, a mapping function for the internal combustion engine, where the mapping function defines combustion timing of a given cylinder in the engine at a next cycle in terms of inputs selected from a group consisting of combustion timing of the given cylinder in present cycle, an indicator of fuel injected into the given cylinder in the present cycle, crank angle at which fuel injection occurred in the present cycle and one or more pressure measures made inside the given cylinder;
   capturing, by the controller, measurements of the inputs and corresponding combustion timing of the given cylinder at the next cycle during varied operating conditions of the engine;
   determining, by the controller, a vector that scales the inputs of the mapping function to the output of the mapping function using a least squares method, wherein the vector identifies the mapping function;
   storing the captured measurements of the inputs and the output as the training data;
   downloading the training data and the vector into a data store in a vehicle having an internal combustion engine;

populating a buffer with adaptive data for the given cylinder in the present cycle, where the adaptive data are measures of the inputs and the output of the mapping function that were captured during m most recent combustion cycles of the given cylinder;

combining the training data with the adaptive data to form a combined data set, where the training data excludes the adaptive data;

updating the vector using a combined data set;

predicting combustion timing of the given cylinder in the next cycle using the vector and measures of the inputs during the present cycle; and controlling combustion timing in the internal combustion engine of the vehicle based in part on the predicted combustion timing.

12. The method of claim 11 wherein the combustion timing of a given cylinder at the next cycle is further defined as crank angle at the time fifty percent of net heat release has occurred.

13. The method of claim 12 wherein the one or more pressure measures include a pressure inside the given cylinder during carryover from one combustion cycle to another combustion cycle, a pressure inside the cylinder before gas is fully expanded, and a pressure inside the given cylinder when gas is being compressed.

14. The method of claim 11 wherein determining a vector further comprises machine learning the mapping function with a single-hidden layer feedforward neural network with randomly chosen weights for each of the hidden nodes in the neural network.

15. The method of claim 1 wherein the inputs of the mapping function are identified by unsupervised learning, deep learning, or autoencoders.

16. A controller for an internal combustion engine residing in a vehicle, comprising:

a data store configured to store training data used to identify a mapping function and associated with the controller, where the training data is measures of the inputs and the outputs of the internal combustion engine over a range of operating conditions, the mapping function defines a relationship between inputs and an output associated with the engine, the output is combustion timing of a given cylinder of the engine in a next cycle, and the inputs include combustion timing of the given cylinder in the given cylinder in a present cycle and one or more parameters indicative of mixture state and composition from the present cycle to the next cycle;

a buffer configured to store adaptive data for the given cylinder, where the adaptive data are measures of the inputs and corresponding output of the mapping function captured during m most recent cycles of the given cylinder and excludes the training data;

an adaptor module configured to receive adaptive data for the given cylinder and populate the buffer with the received adaptive data;

a predictor module having access to the buffer and the data store, the predictor module configured to combine the training data with the adaptive data residing in the buffer, determine a matrix that scales one or more transformations of the inputs of the mapping function to the output of the mapping function using a weighted least squares method, and predict combustion timing for the given cylinder in the next cycle using the matrix and measures of the inputs during the present cycle;

a control module interfaced with one or more fuel injectors and configured to control the fuel injectors based in part on the predicted combustion timing for the given cylinder.

17. The engine controller of claim 16 further comprises a pressure sensor or an ion current sensor residing in the given cylinder and interfaced with the adaptor module.

18. The engine controller of claim 16 further comprises a position sensor interfaced with the adaptor module, wherein the internal combustion engine has one or more pistons driven by a crankshaft and the position sensor is configured to determine crank angle of the crankshaft.

19. The engine controller of claim 18 wherein the inputs for the mapping function are selected from a group consisting of combustion timing of the given cylinder in present cycle, an indicator of fuel injected into the given cylinder in the present cycle, crank angle(s) at which fuel injection occurred in the present cycle and one or more pressure measures made inside the given cylinder.

20. The engine controller of claim 19 wherein the mapping function is implemented by a single-hidden layer feedforward neural network with randomly chosen input weights for each of the hidden nodes in the neural network.

21. The engine controller of claim 20 wherein the control module controls the fuel injector by determining crank angle of the crankshaft at which to inject fuel during the next cycle in accordance with $$SOI_{n+1} = SOI_n - \frac{f(SOI_n) - \text{target } CA50}{f'(SOI_n)}$$

where $SOI_n$ is crank angle at which fuel injection occurred in the present cycle, $f(SOI_n)$ is the adapted mapping function as a function of SOI while holding other inputs fixed, $f'(SOI_n)$ is the derivative of $f(SOI_n)$ with respect to SOI, and target CA50 is the desired combustion timing of the given cylinder in the next cycle.

* * * * *